(12) United States Patent
Coke et al.

(10) Patent No.: US 7,566,689 B2
(45) Date of Patent: Jul. 28, 2009

(54) CLEANING METHOD

(75) Inventors: Mark Coke, Swanland (GB); Malcolm Tom McKechnie, Driffield (GB); Neil Muir, Welton (GB)

(73) Assignee: Reckitt Benckiser (UK) Limited, Slough, Berkshire (GB)

( * ) Notice: Subject to any disclaimer, the term of this patent is extended or adjusted under 35 U.S.C. 154(b) by 106 days.

(21) Appl. No.: 10/363,272

(22) PCT Filed: Sep. 3, 2001

(86) PCT No.: PCT/GB01/03936

§ 371 (c)(1),
(2), (4) Date: Jun. 20, 2003

(87) PCT Pub. No.: WO02/18533

PCT Pub. Date: Mar. 7, 2002

(65) Prior Publication Data

US 2004/0034940 A1    Feb. 26, 2004

(30) Foreign Application Priority Data

Sep. 1, 2000 (GB) .................................. 0021585.5
Apr. 19, 2001 (GB) .................................. 0109584.3

(51) Int. Cl.
    *C11D 3/37* (2006.01)
(52) U.S. Cl. .................. 510/496; 252/192; 510/499; 510/504; 510/520
(58) Field of Classification Search ................ 510/504, 510/520, 496, 499; 252/91, 192; 8/137
See application file for complete search history.

(56) References Cited

U.S. PATENT DOCUMENTS

| 3,434,864 | A |   | 3/1969  | Haden et al. ............... 117/36.2 |
| 3,954,642 | A | * | 5/1976  | Schwuger ................ 15/104.93 |
| 3,956,155 | A | * | 5/1976  | Schwuger ................ 15/104.93 |
| 4,066,394 | A |   | 1/1978  | Leonard ........................ 8/137 |
| 4,077,891 | A |   | 3/1978  | Beimesch et al. ............ 252/8.8 |
| 4,128,399 | A |   | 12/1978 | Liotta et al. .................... 23/230 |
| 4,255,148 | A |   | 3/1981  | Reinwald et al. ............... 8/137 |
| 5,560,829 | A | * | 10/1996 | Adams et al. ............... 210/687 |
| 5,863,887 | A |   | 1/1999  | Gillette ...................... 510/520 |
| 5,919,894 | A |   | 7/1999  | Schubert .................... 528/328 |

FOREIGN PATENT DOCUMENTS

| DE | 23 33 510 A1 | 2/1977 |
| WO | 96 34908 | 11/1996 |

OTHER PUBLICATIONS

PCT International Search Report, dated Nov. 16, 2001, for PCT/GB01/03936.
GB Search Report, dated Feb. 12, 2001, for GB 0021585.5.
Database WPI, Section Ch, Week 199423, Derwent abstract, XP 002182979.
Derwent abstract, week 197415 2192208, Derwent access No. 1974-06598V.
Derwent abstract, week 1977707 for DE 25 33510 A1, Derwent Access No. 1977-113478.

* cited by examiner

*Primary Examiner*—Bernard Lipman

(57) ABSTRACT

A cleaning method employs a textile article immersed in or retaining water. The textile article has calcium-binding moieties to soften the wash water and improve cleaning.

17 Claims, No Drawings

CLEANING METHOD

This invention relates to a method of cleaning using water, in which the water is softened and/or in which the deposition of hard water scale is diminished. The invention relates in particular to such a method carried out in a domestic environment.

It is well known that certain metal compounds, notably calcium compounds, when present in water, have a significant effect on the properties of the water. "Hard" water containing a significant loading of soluble calcium and magnesium compounds forms a scum with soap or detergent and may require a large amount of soap or detergent in order to form a lather. Scale deposits can readily form from such water, for example on heating or pH change or evaporation. These can be encrustations, or watermarks left on evaporation of water droplets from, especially, a shiny surface.

There have been many proposals for removal of metal ions from aqueous solutions. In the industrial context proposals have included filter beds and polymeric filters for capturing heavy metal ions from an aqueous solution flowing within a passageway. Examples are given in EP 992238A and GB 20869564A. In the domestic context chelating compositions can be added to an aqueous washing solution and these can capture metal ions, such as calcium ions. Examples of chelating compositions are given in EP-A-892040. However in a multi-step washing process, such as that carried out by a clothes washing machine, it can be a problem that the chelating agent is discharged, with the water, at an intermediate stage of the process.

There is a need for a technology which can bind metal ions, at least calcium ions and preferably other metal ions in addition, in a convenient manner, through the entire course of a cleaning procedure.

In accordance with a first aspect of the present invention there is provided a cleaning method which employs a textile article immersed in or retaining water, the textile article having calcium-binding moieties. Suitably the textile article and/or the water contains a cleaning agent, for example a surfactant.

Preferably the cleaning method is for cleaning household articles.

The method of cleaning may be a method of ware washing using a machine, for example a clothes' washing machine or a dishwashing machine.

In such methods the cleaning water is suitably produced by dissolution of a liquid or solid cleaning concentrate in the machine, at or immediately after the start of the washing operation. Such concentrates suitably include one or more of an anionic surfactant, a non-ionic surfactant, an amphoteric surfactant or a cationic surfactant. For machine washing anionic and non-ionic surfactants are preferred.

A suitable anionic surfactant is an anionic organic surfactant, which is usually employed in a soluble salt form, preferably as an alkali metal salt, especially as a sodium salt. Although other types of anionic detergents may be utilized, such as higher fatty acyl sarcosides, alkyl sulphosuccinates, alkyl ether sulphosuccinates, alkylamide sulphosuccinates, alkyl sulphosuccinates, alkyl sulphoacetates, alkyl phosphates, alkyl ether phosphates, acyl isothionates, N-acyl taurates and acyl lactylates, or conventional "soaps" of fatty acids, the preferred anionic surfactants employed are those which are described as being of a sulphonate or sulphate type. These include linear higher alkylaryl sulphonates (for example alkylbenzene sulphonates), alkyl sulphates, alkyl ether sulphates, alkylamidoether sulphates, alkylarylpolyether sulphates, monoglyceride sulphates, alkyl sulphonates, alkylamido sulphonates, higher fatty alcohol sulphates, higher fatty alcohol polyalkoxylate sulphates, olefin sulphonates, α-methyl ester sulphonates and paraffin sulphonates. An extensive listing of anionic detergents, including such sulph(on)ate surfactants, is given at pages 25 to 138 of the text Surface Active Agents and Detergents, Vol. II, by Schwartz, Perry and Berch, published in 1958 by Interscience Publishers, Inc., and is incorporated herein by reference. Usually the higher alkyl group of such anionic surfactants is of 8 to 24, especially 10 to 20 carbon atoms, preferably 12 to 18 carbon atoms, and the alkoxylate content of such anionic surfactants that are alkoxylated (preferably ethoxylated or ethoxylated/propoxylated) is in the range of 1 to 4 alkoxy groups per mole.

One preferred class of anionic surfactants comprise the alkali metal (preferably sodium) alkyl sulphates, preferably having linear $C_{12-18}$ alkyl groups.

Another preferred class of anionic surfactants comprise alkali metal (preferably sodium) alkylaryl sulphonates (especially alkylbenzene sulphonates), preferably having linear $C_{10-13}$ alkyl groups.

A preferred non-ionic surfactant is a condensation product of a higher fatty alcohol or alkyl phenol with a lower alkylene oxide, such as ethylene oxide or a mixture of ethylene oxide and propylene oxide. In such non-ionic surfactants the higher fatty moiety will normally be of 7 to 16 carbon atoms and there will usually be present from 3 to 20, preferably 4 to 15 moles of alkylene oxide per mole of higher fatty alcohol.

Another class of non-ionic surfactants that could be used are sorbitan esters of fatty acids having from 10 to 24 carbon atoms, for example sorbitan mono-oleate.

Amphoteric surfactants which may be used include amphoteric betaine surfactant compounds having the following general formula:

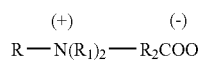

wherein R is a hydrophobic group which is an alkyl group containing from 10 to 22 carbon atoms, preferably from 12 to 18 carbon atoms, an alkylaryl or arylalkyl group containing a similar number of carbon atoms with a benzene ring being treated as equivalent to about 2 carbon atoms, and similar structures interrupted by amido or ether linkages; each $R_1$ is an alkyl group containing from 1 to 3 carbon atoms; and $R_2$ is an alkylene group containing from 1 to 6 carbon atoms.

Examples of cationic surfactants which may be used include quaternary ammonium compounds and salts thereof, including quaternary ammonium compounds which also have germicidal activity and which may be characterized by the general structural formula:

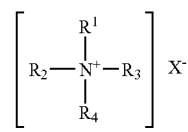

when at least one of $R_1$, $R_2$, $R_3$ and $R_4$ is a hydrophobic, aliphatic, aryl aliphatic or aliphatic aryl group containing from 6 to 26 carbon atoms, and the entire cationic portion of the molecule has a molecular weight of at least 165. The hydrophobic groups may be long-chain alkyl, long-chain alkoxy aryl, long-chain alkyl aryl, halogen-substituted long-chain alkyl aryl, long-chain alkyl phenoxy alkyl or aryl alkyl. The remaining groups on the nitrogen atoms, other than the hydrophobic radicals, are generally hydrocarbon groups usually containing a total of no more than 12 carbon atoms. The radicals $R_1$, $R_2$, $R_3$ and $R_4$ may be straight chain or may be branched, but are preferably straight chain, and may include one or more amide or ester linkages. The radical X may be any salt-forming anionic radical.

Examples of quaternary ammonium salts within the above description include the alkyl ammonium halides such as cetyl trimethyl ammonium bromide, alkyl aryl ammonium halides such as octadecyl dimethyl benzyl ammonium bromide, and N-alkyl pyridinium halides such as N-cetyl pyridinium bromide. Other suitable types of quaternary ammonium salts include those in which the molecule contains either amide or ester linkages, such as octyl phenoxy ethoxy ethyl dimethyl benzyl ammonium chloride and N-laurylcocoaminoformyl-methyl)-pyridinium chloride. Other effective types of quaternary ammonium compounds which are useful as germicides includes those in which the hydrophobic radical is characterized by a substituted aromatic nucleus as in the case of lauryloxyphenyltrimethyl ammonium chloride, cetylaminophenyltrimethyl ammonium methosulphate, dodecylphenyltrimethyl ammonium methosulphate, dodecylphenyltrimethyl ammonium chloride and chlorinated dodecylphenyltrimethyl ammonium chloride.

Preferred quaternary ammonium compounds which act as germicides and which are useful in the present invention include those which have the structural formula:

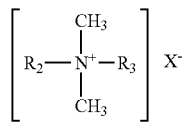

wherein $R_2$ and $R_3$ are the same or different $C_8$-$C_{12}$alkyl, or $R_2$ is $C_{12}$-$C_{16}$alkyl, $C_8$-$C_{18}$alkylethoxy, $C_{8\text{-}C18}$alkyl-phenolethoxy and $R_2$ is benzyl, and X is a halide, for example chloride, bromide or iodide, or methosulphate. The alkyl groups $R_2$ and $R_3$ may be straight chain or branched, but are preferably substantially linear.

In any method of the invention, a mixture of two or more surfactants may be used. Other known surfactants not particularly described above may also be used. Such surfactants are described in McCutcheon's Detergents and Emulsifiers, North American Edition, 1982; Kirk-Othmer, Encyclopaedia of Chemical Technology, 3rd Ed., Vol. 22, pp 346-387.

It is preferred that the cleaning agent used in a machine washing method contains a builder. Suitable builders include water-soluble inorganic salt builders, preferably sodium salts, such as sodium polyphosphates, e.g. sodium tripolyphosphate and sodium pyrophosphate, sodium carbonate, sodium bicarbonate, sodium sesquicarbonate, sodium silicate, sodium disilicate, sodium metasilicate and sodium borate. In addition to the water-soluble inorganic salts, water-insoluble builders may also be useful, including the ion exchanging zeolites, such as Zeolite 4A. Organic builders may also be employed. Among suitable organic builders are polyacetal carboxylates, as described in US-B-4725455, and water-soluble salts of lower hydroxycarboxylic acids, such as sodium citrate and sodium gluconate.

The cleaning method may be a manual method, for example using a hand-cloth or mop, and an open vessel, for example a bucket or bowl. Thus, the cleaning method could be a method of cleaning a hard surface, for example a window, tiled surface, shower screen, tableware and kitchenware, a sanitaryware article, for example a shower screen, lavatory, wash basin or sink, a car (defined herein as a "household article") or a kitchen worktop.

In such methods the cleaning agent is dissolved in water prior to the start of cleaning. The cleaning agent may comprise an anionic surfactant and/or a non-ionic surfactant, as described above. Additionally or alternatively, the cleaning agent may include one or more of an amphoteric surfactant and a cationic surfactant, as described above.

A composition used in the invention may optionally include one or more conventional additives known to be useful in cleaning compositions including bleaching agents, viscosity modification agents, fragrances (natural or synthetically produced), foaming or foam-control agents, solvents, fillers, colouring agents, and in the case of compositions for fabric washing, fabric conditioning agents, enzymes, hydrotropes and dye anti-redeposition agents. If the composition does not contain a cationic surfactant having germicidal properties as detailed above, a germicidal agent may be incorporated as an optional ingredient into the cleaning agents used in the invention. Examples are phenolic group containing compounds such as o-phenyl-phenol, o-benzyl [p-chlorophenol] and 4-tertamylphenol.

The textile article acts as a water softener within a vessel containing water, for example a bucket, sink or ware-washing machine. By capturing metal ions, notably calcium ions, the cleaning agent(s) present in the water can work more effectively, and/or the vessel is soiled or scaled less, whether by soap scum or by encrustations or by watermarks left when droplets on a surface evaporate.

Preferably the textile article is such that calcium ions are captured throughout the method of cleaning.

Preferably the textile article is able to move freely within the water used in the cleaning method. Thus, it is preferably not in the form of a filter or like body, retained in a fixed orientation, or mounted on a frame.

In the cleaning method the textile article is preferably a sheet, for example a woven, knitted or non-woven sheet. The sheet may if wished be secured to one or more further sheets, which may be of the same or different material, forming a ply. Alternatively the textile article may be in the form of a thick yarn, or braid. Alternatively it may be in the form of fibres or filaments, which may, for example, be tied together in a bundle, for example in a tassel or pom-pom, or retained in a water-permeable bag. Most preferably the textile article is a fabric sheet of relatively open form, for example a non-woven fabric or a woven fabric of scrim form.

The textile article may if wished be contained within a rigid or flexible structure in which liquid inlet and liquid outlets are provided to allow ingress and egress of water. Such a container may be for instance a cloth bag or a plastic cage.

It will be appreciated that the textile article can improve cleaning by acting as a water softener, by facilitating capture of metal ions, notably calcium ions, from the water.

Preferably the textile article is also able to bind magnesium ions. Most preferably it is able to bind further ions, for example copper and iron ions. Preferably the moieties which are able to bind calcium ions are also able to bind such further ions, notably magnesium ions.

The textile article could be discarded after use, or it could be regenerated, for example using sodium chloride to effect cation exchange. A dye could be employed to give a colour change, on exhaustion of the available calcium-binding moieties on the textile article.

Most preferred is a method which employs a textile article having polymeric fibres with calcium-binding side chains.

Such polymeric fibres may have one type of side chain or two, or more, types of side chain, able to bind different metal ions.

The polymeric fibres may be prepared in any of a number of ways. The side chains may be grafted onto the fibres, for example using the well-known techniques of radiation (or ionisation) grafting or chemical grafting. Radiation grafting is described in WO 94/12545. Chemical grafting is described in GB 2086954A. Alternatively, for certain side-chains the polymeric fibres may be fabricated (for example melt spun) already bearing the side-chains, as described in EP 486934A. In yet other embodiments the polymeric fibres not bearing the side-chains may be coated with material which has the side-chains. The polymeric fibres may, in effect, be regarded as carrying the side-chains by mechanical adhesion. Alternatively they may be attached by cross-linking, as described in EP 992283A.

Preferably the calcium-binding side-chains are any side-chains which can be carried by polymeric fibres of textile character, and which are able to bind calcium (and preferably other) ions, and whose effectiveness in doing that is not substantially diminished by a cleaning agent. Suitable calcium-binding side-chains include residues of acids, for example of acrylic or methacrylic acid, or carboxylic acids, or of sulphonic acids, or of phosphonic acids. Residues of organic acids are preferred. Particularly preferred are residues of methacrylic or, especially, acrylic acid.

Alternative calcium-binding side chains may include amino groups, quaternary ammonium salt groups and iminodicarboxyl groups —N{$(CH_2)_n$COOH}$_2$, where n is 1 or 2. Further suitable calcium-binding side chains may include residues of alginic compounds, for example of alginic acid and of alginates.

Further suitable calcium-binding side chains may include acyl groups as described in EP 984095A. These have the formula

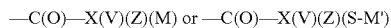
—C(O)—X(V)(Z)(M) or —C(O)—X(V)(Z)(S-M')

where X represents a residue in which one carboxyl group is eliminated from a monocarboxylic acid or dicarboxylic acid;
  V represents hydrogen or a carboxyl group;
  M represents hydrogen; or

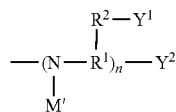

wherein $R^1$ represents a residue in which one hydrogen is eliminated from a carbon chain in an alkylene group, $R^2$ represents a direct bond or an alkylene group, $Y^1$ and $Y^2$ are the same or different and each represents hydrogen, a carboxyl group, an amino group, a hydroxy group or a thiol group, n is an integer of 1 to 4, M' represents hydrogen or

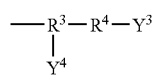

wherein $R^3$ represents a residue in which one hydrogen is eliminated from a carbon chain in an alkylene group; $R^4$ represents a direct bond or an alkylene group, $Y^3$ and $Y^4$ are the same or different and each represents hydrogen, a carboxyl group, an amino group, a hydroxy group or a thiol group; and Z represents hydrogen or has the same meaning as that of M.

Such side-chains are preferably carried by polymeric fibres selected from polyolefins, poly(haloolefins), poly(vinylalcohol), polyesters, polyamides, polyacrylics, protein fibres and cellulosic fibres (for example cotton, viscose and rayon), most preferably by polyolefins, polyarcylics and cellulosic fibres. Polyolefins are especially preferred, particularly polyethylene and polypropylene.

When side-chains are grafted onto the base polymeric fibres a preferred process is one in which the side-chains are grafted to the base polymeric fibre using irradiation, in an inert atmosphere, with immediate delivery to the irradiated fibres of acrylic acid. Preferably the radiation is electron beam or gamma radiation, to a total dose of 10-300 kGy, preferably 20-100 kGy. The acrylic acid is preferably of concentration 20-80 vol %, in water, and the temperature at which the acrylic acid is supplied to the irradiated textile article is preferably an elevated temperature, for example 30-80° C. Preferably the base polymeric fibres are polyethylene, polypropylene or cellulosic fibres. The reaction to introduce the side-chains may be carried out on the fibres as such or may suitably be carried out on an already-formed textile article, for example a braid or sheet.

Components other than such side-chains may be provided on the textile article in order to give, or improve, water softening, thereby assisting cleaning. Such components will provide three main types of method of action, described below.

1) Ion exchange agents—such agents include alkali metal (preferably sodium) aluminosilicates either crystalline, amorphous or a mixture of the two. Such aluminosilicates generally have a calcium ion exchange capacity of at least 50 mg CaO per gram of aluminosilicate, comply with a general formula:

0.8-1.5 $Na_2O.Al_2O_3$.0.8-6 $SiO_2$ and incorporate some water. Preferred sodium aluminosilicates within the above formula contain 1.5-3.0 $SiO_2$ units. Both amorphous and crystalline aluminosilicates can be prepared by reaction between sodium silicate and sodium aluminate, as amply described in the literature.

Suitable crystalline sodium aluminosilicate ion-exchange detergency builders are described, for example, in GB 1429143 (Procter & Gamble). The preferred sodium aluminosilicates of this type are the well known commercially available zeolites A and X, and mixtures thereof. Also of interest is zeolite P described in EP 384070 (Unilever).

Another class of compounds are the layered sodium silicate builders, such as are disclosed in U.S. Pat. No. 4,464,839 and U.S. Pat. No. 4,820,439 and also referred to in EP-A-551375.

These materials are defined in U.S. Pat. No. 4,820,439 as being crystalline layered, sodium silicate of the general formula

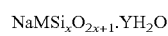
$NaMSi_xO_{2x+1}$.$YH_2O$ where
  M denotes sodium or hydrogen,
  x is from 1.9 to 4 and y is from 0 to 20.

Literature references describing the preparation of such materials include Glastechn. Ber. 37,194-200 (1964), Zeitschrift fur Kristallogr. 129, 396-404 (1969), Bull. Soc. Franc. Min. Crist., 95, 371-382 (1972) and Amer. Mineral, 62, 763-771 (1977). These materials also function to remove calcium and magnesium ions from water. Also covered are salts of zinc which have also been shown to be effective water softening agents.

2) Ion capture agents—agents which prevent metal ions from forming insoluble salts or reacting with surfactants, such as polyphosphate, monomeric polycarbonates, such as citric acid or salts thereof, EDTA, algins, alginates.

3) Anti-nucleating agents—agents which prevent seed crystal growth, such as polycarbonate polymers, such as polyacrylates, acrylic/maleic copolymers, and acrylic phosphonates.

In a preferred aspect such ingredient(s) may be impregnated into the textile fibre.

In a preferred aspect such ingredient(s) may be conveniently present on the textile article. Such ingredient(s) may be deposited on the textile article by dosing a solution to the textile article and evaporating the solute. Spray drying techniques may be employed. Ionic charge may also be employed to reversibly bind anionic ionisable ingredients to the textile article.

The textile article can have bound to it such ingredients in the form of particles of a material, as described above, with those particles not being released from the textile article in use.

Alternatively the textile article could carry on it particles of a material, as described above, with those particles being washed from the textile article, and dissolved or dispersed in the wash water, in use.

Alternatively there can be a hybrid system in which some such particles remain on the textile article and some are washed off, during the method.

The washing off of particles of such materials may be rapid in water or may be slow/progressive. A slow-release system may be attractive in obtaining good activity, for example calcium binding, throughout a cleaning method.

A suitable method of applying the present invention involves the use of a textile article with calcium binding side chains, as defined above, and also carrying said further ingredient(s), preferably particles, as defined above.

Preferably the textile article is substantially without means to capture anionic species in the water.

In accordance with a second aspect of the invention there is provided a method of cleaning in a ware washing machine, the method including softening the water in the machine, using a textile article having calcium-binding moieties.

In the second aspect the textile article may be such that water is softened in the wash cycle. Preferably it is softened in the rinse cycle. Most preferably it is softened both in the wash and in the rinse cycles.

The invention will now be described, by way of embodiment, with reference to the following examples.

EXAMPLE 1

Grafting of Acrylic Acid onto Polyethylene Fibres.

Chopped polyethylene fibres of 20 mm length are placed in a plastic bag, purged with nitrogen and sealed. The bag is irradiated with 10 MeV electrons from a linear accelerator. The total radiation dose is 30 kGy. The fibres are removed from the bag and immersed without delay in a nitrogen-purged aqueous solution containing 40 vol % acrylic acid for 45 minutes at 62° C. The grafted fibres were extracted with water overnight.

EXAMPLE 2

Use of the Grafted Fibres of Example 1

The fibres are placed in a small bag of non-woven polyethylene, which is heat sealed. The bag is placed in the drum of a washing machine, with the clothes, at the start of a washing cycle. It is removed, with the clothes, at the end of the cycle, having provided water softening throughout the cycle, to assist the washing process.

EXAMPLE 3

Grafting of Acrylic Acid onto Non-woven Viscose Fleece

A non-woven viscose single layer fleece sheet is irradiated under a nitrogen atmosphere using an electron beam accelerator operating at 175 kV, to a total dose of 300 kGy. The sheet is immediately immersed in a nitrogen-purged aqueous solution containing 60 vol % acrylic acid for 5 hours at 35° C. The grafted fabric is extracted overnight.

EXAMPLE 4

Use of the Fabric of Example 3

The fabric of Example 3 is divided into sections of size 15 cm×15 cm.

One section is used in a clothes washing cycle in the manner described in Example 2 in order to give effective water softening, throughout the cycle.

Another section is used in a method of cleaning a car, as the final drying cloth, in order to achieve drying without leaving watermarks, ie the hard water residues of evaporated droplets.

Another section is used as a drying cloth in window cleaning. Drying is achieved without streaks or watermarks.

Another section is used in a method of removing light scale deposits from a shower enclosure. A small amount of shower cleaner is applied to the section, and the deposits are removed, using the fabric with a rubbing action.

Another section is used as a manual washing up cloth, to wash dirty kitchenware and tableware.

EXAMPLE 5

Use of Sandwiched Radiation Grafted Cloth

A heat sealed laminate comprised a middle calcium sequestrant layer between two outer layers.

Composition of each outer layer:

20 g/m² sheet weight, laid (non-woven) fibres, a blend of:
20% cellulose, 10 mm staple length
40% viscose, 10 mm staple length
20% polyester bicomponent, 6 mm staple length
20% polyester bicomponent, 12 mm staple length Composition of middle layer:

75 g/m² sheet weight, laid (non-woven) fibres, a blend of:
80% 10 mm staple length viscose fibres radiation grafted with 7.5 mM/g carboxylate functionality
10% polyester bicomponent, 6 mm staple length
10% polyester bicomponent, 12 mm staple length A 4.5 cm×4.5 cm piece of this cloth immersed for 30 minutes in 500 ml hard water, at 60° C., reduced the calcium ion level from 170 mg/l to 143 mg/l (determined by EDTA titration).

EXAMPLE 6

Use of Polyacrylate Cloth

Polyacrylate fibres are made by copolymerising acrylic acid, sodium acrylate, methacrylic acid and hydroxypropylmethacrylic acid in an aqueous premix. Polymerisation is initiated by ammonium persulphate. The resulting cross-linked polymer is extruded into a hot air stream to form fibres. These fibres are then incorporated with other fibres into a non-woven cloth. In this example the cloth was of 145 g/m$^2$ sheet weight, made up of:

50% wt polyacrylate fibre, described above
50% wt polyester bicomponent

A 4.5 cm×4.5 cm piece of this cloth immersed for 30 minutes in 500 ml hard water, at 60° C., reduced the calcium ion level from 170 mg/l to 138 mg/l (determined by EDTA titration).

EXAMPLE 7

Use of Sandwiched Polyacrylate Cloth

This employed a fresh non-woven cloth as described in Example 6, but also comprising a layer of 30 g/m$^2$ spunbonded polypropylene laminated onto both sides to give a three layer structure.

A 4.5 cm×4.5 cm piece of this cloth immersed for 30 minutes in 500 ml hard water, at 60° C., reduced the calcium level from 170 mg/l to 148 mg/l (determined by EDTA titration).

EXAMPLE 8

Use of Derivatised Cellulose Cloth

A cellulose based non-woven cloth is chemically derivatised to give polycarboxylate functionality. Thus, a chemically bonded cellulose non-woven sheet, 95 g/m$^2$ weight, is derivatised with succinic anhydride to give 1.71 mMol/g COOH.

A 4.5 cm×4.5 cm piece of this cloth immersed for 30 minutes in 500 ml hard water, at 20° C., reduced the calcium level from 176 mg/l to 154 mg/l (determined by EDTA titration).

EXAMPLE 9

Machine Wash Tests

The cloths described in Examples 5, 6 and 7 were used in washing machine testing in order to assess calcium carbonate encrustation on the heating element. The washing machine employed was a CANDY 80 PLUS. Each washing load was 3.5 kg. A 60° C programme was selected. The water hardness was 172 mg/l Ca$^{2+}$. The detergent employed was 168 g DASH ESSENTIAL, a commercial washing powder available in supermarkets in Italy, having the following composition (by weight):

| | |
|---|---|
| anionic surfactant | 11.7% |
| zeolite | 18.9% |
| sodium silicate | 2.7% |
| sodium citrate | 3.5% |
| sodium carbonate | 25.9% |
| sodium percarbonate | 11.5% |
| TAED | 1.4% |
| Protease | 0.2% |

-continued

| | |
|---|---|
| Amylase | 0.8% |
| Phosphonate | 0.3% |
| Polymer | 1.6% |

Prior to the experiments the washing machine element was weighed. It was re-weighed after 15 washes. The results were as follows:

| | |
|---|---|
| Detergent alone | 660 mg HEE |
| Detergent + Ex.5 cloth but mono-ply | 540 mg HEE |
| Detergent + Ex.5 tri-ply cloth | 560 mg HEE |
| Detergent + Ex.6 mono-ply cloth | 430 mg HEE |
| Detergent + Ex.7 tri-ply cloth | 450 mg HEE |

HEE = Heating Element Encrustation

All cloths were approximately 625 cm$^2$ in area and a fresh cloth was used for each wash cycle.

EXAMPLE 10

Use of Derivatised Viscose Fibres in a Bag

In further experiments JR Crompton's SUPERSEAL (trade mark) three-ply tea bag paper, Ref. No. 478404, grammage 26.0 gsm was used to retain radiation grafted viscose fibres. The chopped viscose fibres had been irradiated using the method described for Example 1, under a nitrogen atmosphere using an electron-beam accelerator. Once the dosage had reached a specified value in kGy the fibres had been immersed immediately in a nitrogen-purged aqueous solution of acrylic acid, at a moderately elevated temperature.

A first bag, 7 cm×7 cm, contained 0.884 g of functionalised fibres (19% dry weight) between the two paper sheets, and reduced the calcium ion concentration of a hard water from 174.3 ppm to 132.3 ppm (determined by EDTA titration).

A second bag, 7 cm×7 cm, contained 1.768 g of functionalised fibres between the two paper sheets and reduced the calcium ion concentration of a hard water from 168.3 ppm to 92.3 ppm (determined by EDTA titration).

The invention claimed is:

1. A method of ware washing using a clothes washing machine which method comprises the steps of:
   (a) providing a textile article immersed in water present in the clothes washing machine said textile article comprising calcium-binding moieties and an insoluble builder, said builder comprising an alkali metal aluminosilicate, the water having a cleaning concentrate dissolved therein, and wherein the textile article is a carrier for calcium-binding particles which dissolve or disperse in water with which the textile article is in contact; and
   (b) discarding said textile article after use.

2. A method as claimed in claim 1, wherein the textile article has polymeric fibres with calcium-binding side chains.

3. A method as claimed in claim 2, wherein the side chains are attached to the polymeric fiber by radiation grafting.

4. A method as claimed in claim 2, wherein the side chains are attached to the polymeric fibres by chemical grafting; or by coating base fibres with a composition carrying the side chains, and cross-linking the side chains to the base fibres and/or relying on adhesion to retain them; or wherein they are present already in the polymeric and/or base fibres.

5. A method as claimed in claim 2, wherein the side chains are residues of organic acids.

6. A method as claimed in claim 5, wherein the side chains are residues of acrylic or methacrylic acid, or of sulphonic acids, or of phosphonic acids.

7. A method as claimed in claim 2, wherein the polymeric fibres to which the side chains are attached are selected from polyolefins, polyhaloolefins, polyvinylalcohols, polyesters, polyamides, polyacrylics, protein fibres and cellulosic fibres.

8. A method as claimed in claim 2, wherein the textile article changes color on exhaustion of the available calcium-binding side chains.

9. A method as claimed in claim 1, which is a ware washing method using a ware washing machine.

10. A method as claimed in claim 1, in which the method comprises removing scale or diminishing its deposition.

11. A method as claimed in claim 1, wherein the textile article is a cloth.

12. A method as claimed in claim 11, wherein the textile article is a non-woven sheet.

13. A method as claimed in claim 1, wherein the calcium-binding moieties are also able to bind magnesium ions.

14. A method as claimed in claim 1, wherein the textile article contains water softening agents which dissolve or disperse in water selected from the group consisting of:
   a) an ion exchange agent,
   b) an ion capture agent, and
   c) an anti-nucleating agent.

15. A method of improving the operation of a ware washing machine, by softening the water therein, the method which comprises immersing or retaining a textile article in water having a cleaning concentrate dissolved therein, the textile article comprising calcium-binding moieties and an insoluble builder, said builder comprising an alkali metal aluminosilicate and wherein the textile article is a carrier for calcium-binding particles which dissolve or disperse in water with which the textile article is in contact.

16. A method as claimed in claim 1 wherein the alkali metal aluminosilicate is sodium aluminosilicate.

17. A method as claimed in claim 16 wherein the sodium aluminosilicate is selected from zeolite A, zeolite X, mixtures of zeolites A and X, and zeolite P.

* * * * *